Patented Aug. 20, 1940

2,212,445

UNITED STATES PATENT OFFICE 2,212,445

PROCESSING AND DRYING EGG WHITES

Verne D. Littlefield, Beverly Hills, Calif., and Norman C. Fischer, Springfield, Mo., assignors to Armour and Company, Chicago, Ill., a corporation of Illinois No Drawing. Application July 14, 1938,
Serial No. 219,279

3 Claims. (Cl. 99—210)

This invention relates to processing and drying egg whites and it comprises processes wherein egg white material is subjected to acid treatment, fermentation treatment, or both, resulting in the formation of a flocculent mass of insoluble proteins, and the mixture agitated, homogenized, or otherwise treated to maintain the flocculent insolubles in suspension so that no settling thereof occurs prior to drying the thus treated egg whites.

Dried egg whites are materials of increasing economic importance and have been used in the arts for a relatively long period of time. It is an observed fact that egg white, as it comes from the shell after separation from the yolk, cannot be dried to give a satisfactory product. Most all dried egg whites are reconstituted with water prior to use. When so reconstituted the mixture should have good whipping characteristics. The volume of foam measured by standardized procedures should be satisfactory and the stability of the foam, also measured by standardized procedures, should be satisfactory. Before egg whites can be dried to give products which whip satisfactorily certain processing steps are necessary. For many years it has been known that ripened or fermented egg white will, after drying, have better whipping characteristics. These so-called ripened egg whites are made by allowing the egg white to ferment, separating the fermentation scum thus formed, and then drying. Such a fermented egg white has very much better whipping characteristics but it has a pronounced odor indicative of putrefaction. More recently it has been learned that egg whites can be acidified, for example, with hydrochloric acid, the insoluble proteins thus flocculated allowed to settle, and the acidified white spray-dried or pan dried to give a material which also has desirable whipping characteristics.

In certain Littlefield co-pending applications there are described improved ways of acidifying egg whites wherein the pH value of the egg white is maintained at about 5.5 to 5.8, the egg white thereafter separated from flocculated insolubles, and dried. In certain other applications modified procedures are set forth wherein the egg white is acidified and then allowed to ferment after removal of insoluble flocculent materials.

In our further investigations of the behaviour of egg whites on acidification or fermentation, we have discovered the reason why egg whites which have been held for relatively long periods of time in the presence of flocculated proteins undergo putrefaction reactions with the development of odor in the ultimate dried product.

In order that the present invention may be more clearly understood we should like to describe in detail what happens when an egg white is acidified or allowed to ferment. Upon acidification those proteins insoluble at the pH value imparted by the acid are thrown out of solution and within a relatively short period of time they settle to the bottom of the container although small quantities may still remain in suspension. The vats in which the egg whites are treated with acid are of large size and hold as much as 15,000 pounds. Hitherto it has been the practice to allow these insoluble proteins to settle and decant from the vat a substantially clarified, acidified egg white. But in order to avoid fermentation at this stage we have hitherto advocated either maintaining the treated egg whites at low temperature, about 40° to 50° F., or, in the event acidification is at elevated temperatures, separating the clarified egg whites quickly from the insoluble sludge of flocculated proteins.

When the egg whites are treated by fermentation processes it is common to allow the egg whites to ferment in large vats for a period of as long as ninety-six hours. During the reaction the flocculated material thrown out of solution is ballooned to the surface of the layer of egg whites where it forms a voluminous froth-like scum. Fermentation results in the liberation of carbon dioxide which acts as a kind of flotation agent to cause the scum to rise to the surface. Because of the long holding period for fermentation to occur these insoluble proteins undergo decomposition resulting in the formation of odoriferous materials which seem to stay with the body of clarified whites and impart odor to the dried product.

Consequently, in both the acid and the fermentation processes as now practiced it has been considered necessary to separate off flocculated insoluble proteins prior to any drying operation. This has, of course, resulted in a decrease in the available yield of dried egg white solids. Small percentages of insoluble materials in the dried egg white are of no disadvantage except perhaps on some isolated situations where substantially clear solutions are required when the dried egg white is dissolved in water. In the edible food industries small quantities of insoluble material, up to say 3% or 5%, are not objectionable. It is conceivable that they may actually improve foam stability by aiding in the formation of tougher air bubbles. The theory of foam formation is predicated upon the formation of a kind of plastic solid bubble wall, and it is an observed fact in many relations that small amounts of finely divided particles aid in bubble formation because they congregate in the bubble wall and give it tougher characteristics.

Consequently, all things being considered, a better dried egg white could be obtained if the insoluble materials in the acidified or fermented egg white were left therein. It has, however, been common knowledge and belief that these insoluble materials cannot be allowed to remain in the egg white because of the danger of clogging spray nozzles when the egg white is spray-dried, or because of the possibility of fermentation or putrefaction reactions occurring in the insolubles, especially in pan-drying.

We have now discovered that under certain conditions it is entirely unnecessary to put the acidified or fermented egg whites through any separation process for the removal of the flocculent materials. Our invention is based upon the discovery that if these flocculent materials are kept in a state of suspension and are not permitted to settle and aggregate into large clumps, the entire mass can be spray-dried without difficulty of clogging the nozzles, and, moreover, there is no danger of putrefaction. The reasons for this are somewhat obscure but perhaps can be explained as follows. If the flocculent material is allowed to settle in accordance with the usual process, the initial fine particles aggregate together to form clumps and, unless the mixture is kept below the fermentation temperature, the accumulated sludge-like mass really amounts to a concentration of materials harboring bacteria which can quickly thrive and grow. On the other hand if the fine particles are kept in suspension and not allowed to settle they are thus disseminated throughout the body of acid egg white under conditions which tend to inhibit bacterial growth. The same applies in the case of fermentation processes. As the scum of insoluble proteins collects on the surface of the liquid egg whites bacterial growth is increased because of the accumulated scum, especially since it is in contact with the atmosphere. If the fermenting batch of egg whites were kept agitated so that the flocculent particles were continuously broken down and agglomeration thereof prevented, these particles would be kept suspended throughout the fermenting mixture and putrefaction of the insolubles thus prevented.

Consequently, the gist of the present invention resides in maintaining the insoluble flocculent material in a fine state of suspension throughout the acid or fermentation treatment and up to the very point of drying. To put it another way, the present invention avoids any settling or agglomeration as a sludge or scum of insoluble proteins prior to drying.

Having thus stated the broad aspects of our invention it will be apparent that the invention is applicable to any of the known egg white treating processes wherein insoluble proteins are formed as a part of the treatment process. Maintaining the flocculent materials in suspension can be done in several ways. The easiest is by simply agitating with mechanical agitators the batch of egg whites undergoing treatment so that any sludge which may tend to settle is at once stirred up and kept in suspension throughout the treatment process and up to the time of discharging the treated egg whites to the driers. As an alternative, we can use homogenizers which by mechanical action break up the particles of flocculent material and keep them in suspension. Or, we can add traces of dispersing agents, such as small amounts of wetting-out agents, to the egg white during treatment so that these substances help to prevent agglomeration of protein particles.

We shall now give examples of how our invention may be practiced.

After obtaining a batch of egg whites in the usual manner we can, if desired, first subject these egg whites to a homogenizing process to break down the thick portions of the whites and decrease the viscosity of the mixture as a whole. This operation simply consists in passing the liquid egg whites through a suitable homogenizer, many such devices being known, and then running the homogenized egg whites into a large treating vat. For most purposes, however, we need not subject the egg whites to a homogenizing treatment. In the treating vat we then acidify the egg whites in the usual manner using any of the common acids employed for this purpose. Hydrochloric acid is one of the best since no neutralization thereof is necessary prior to drying. During the drying operation any excess hydrochloric acid is driven off. Any other acids, such as tartaric, citric, and others can be used. The prior art gives many examples of suitable acids. During the acidification, which can be at temperatures from 40° F. to as high as just below the coagulation point of the egg whites, proteins insoluble at the pH of the acidification are thrown out of solution and normally tend to settle as a sludge. Instead of allowing this, however, we continuously agitate the mixture during the addition of acid, and thereafter during any holding period of the acidified whites prior to drying so that the flocculent material is kept in a state of suspension and not allowed to settle. After the eggs have been acidified in the manner thus described we then pump the egg whites to a spray-drier where they can be dried in the usual manner. Instead of spray-drying we can use pan drying. During the transfer of the egg whites from the large treating vat to the driers, insufficient time is given for any sludge formation to occur in passage through the pipes. Since the liquid is pumped moderately rapidly from the vat to the drier, the flow of liquid maintains the insoluble materials in a fine state of suspension. The mixture in the vat is kept in agitation until all of the egg white has been withdrawn therefrom so that practically no sludge of insolubles is collected at any time.

The degree of acidification of the egg whites can vary over wide limits depending upon the kind of egg white product desired. The pH value can vary from 5 to 6 as a general rule and, in the present invention, pH values are not particularly critical. In the present case it will be apparent that we are recovering substantially all of the solids content of the original egg white. This solids content will consist mostly of soluble dried egg whites, together with a few percent of insoluble materials.

Egg whites thus prepared have good whipping characteristics. Their foam volume is high and the foam stability is satisfactory.

When we wish to prepare dried egg whites by the fermentation process we charge a vat with the liquid whites, allow fermentation to occur therein with continuous agitation to prevent the accumulation of a scum on the surface and dry while avoiding any substantial settling of the insoluble material. The fermentation process can be speeded up by the addition of small quantities of acid or the addition of various cultures of bacteria in accordance with well known ways. The fermentation reaction is of considerably longer duration than the acidification treatment which means, of course, that the mass undergoing fermentation must be agitated for many hours. We find it better to use the acid type of process in conjunction with the present invention because of the saving in time. But while a dried product made by the fermentation process is desired the principles of the present invention can be used to advantage because there is a saving in dried material which would otherwise be lost, and there is almost complete elimination of decomposition odor.

Products made by the present processes appear to "age" rapidly. It is known, for example, that dried egg whites improve with respect to whipping characteristics in storage. When the egg whites are made in such a way that flocculent insoluble material is not separated off the aging phenomenon appears to be accelerated so that products of high whipping quality are obtained after shorter aging periods.

Although we have more particularly referred to the treatment of whole egg whites it will be understood that we can first separate the thick from the thin portions of the whites and separately treat these materials. The liquid whites can be strained in the usual way to remove bits of shell and the like before acid treatment or fermentation.

Since pH values, time of treatment, and the like are not essential characteristics of the present invention, we have not emphasized these factors. Improvement in yield, and improvement in quality of the product, is had in all instances when the insoluble materials are kept in suspension prior to drying regardless of the type of process used. It will, of course, be apparent, however, that our invention only relates to that type of process where flocculent insolubles are formed within the body of egg white prior to drying.

Variations in our process will, of course, be apparent to those skilled in the art. We can, for example, pass egg white to be treated and acid for the treatment jointly through a homogenizer and thus homogenize during acidification, the effluent from the homogenizer being set either to holding tanks or to the drier.

Or we can acidify or ferment in large vats with ordinary agitation to keep the insolubles in a coarse state of suspension and then pass the mixture through a homogenizer on the way to driers or holding vats.

Having thus described our invention, what we claim is:

1. In processes of treating egg whites prior to drying which result in the formation of insoluble flocculent material, the steps which comprise maintaining the flocculent material in a state of suspension throughout the treatment process and continuously thereafter up to the point of drying the egg whites to prevent the formation of a separated layer of insoluble material, and drying the egg white with its content of insoluble material in fine flocculated, suspended form.

2. The process of treating egg whites which comprises acidifying the egg whites with continuous agitation sufficient to maintain insoluble materials formed therein in suspended condition, continuing the agitation of the mixture to prevent the insoluble materials from forming a separated layer, and passing the mixture to driers while the insolubles are still in suspension.

3. The process of treating egg whites which comprises fermenting the egg whites with agitation sufficient to keep insoluble material formed during fermentation in suspended form throughout the mass of egg whites and thus preventing the formation of a separated, agglomerated mass of insoluble material, maintaining the mixture under agitation throughout the fermentation and passing the mixture to driers while the insoluble particles are still suspended throughout the mixture.

VERNE D. LITTLEFIELD.
NORMAN C. FISCHER.